United States Patent
Rosner et al.

(10) Patent No.: US 7,991,998 B2
(45) Date of Patent: Aug. 2, 2011

(54) SECURE PROXIMITY VERIFICATION OF A NODE ON A NETWORK

(75) Inventors: Martin C. Rosner, Cortlandt Manor, NY (US); Raymond J. Krasinski, Suffern, NY (US); Michael A. Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 988 days.

(21) Appl. No.: 10/529,353

(22) PCT Filed: Sep. 22, 2003

(86) PCT No.: PCT/IB03/04110
§ 371 (c)(1), (2), (4) Date: Mar. 25, 2005

(87) PCT Pub. No.: WO2004/030311
PCT Pub. Date: Apr. 8, 2004

(65) Prior Publication Data
US 2006/0041642 A1 Feb. 23, 2006

Related U.S. Application Data

(60) Provisional application No. 60/414,942, filed on Sep. 30, 2002, provisional application No. 60/445,265, filed on Feb. 5, 2003.

(51) Int. Cl.
*H04L 29/06* (2006.01)
(52) U.S. Cl. .............. 713/168; 713/171; 380/258; 726/3

(58) Field of Classification Search ............... 713/156, 713/168, 170, 171, 178, 181; 709/238, 225, 709/229; 380/258; 726/3
See application file for complete search history.

(56) References Cited

U.S. PATENT DOCUMENTS

| | | | |
|---|---|---|---|
| 6,088,450 A * | 7/2000 | Davis et al. | 713/182 |
| 6,978,023 B2 * | 12/2005 | Dacosta | 380/258 |
| 7,296,088 B1 * | 11/2007 | Padmanabhan et al. | 709/238 |
| 2003/0131129 A1 * | 7/2003 | Becker et al. | 709/238 |
| 2003/0184431 A1 * | 10/2003 | Lundkvist | 340/5.2 |
| 2007/0300070 A1 * | 12/2007 | Shen-Orr et al. | 713/176 |

FOREIGN PATENT DOCUMENTS
WO WO 02/35036 5/2002
* cited by examiner

*Primary Examiner* — Minh Dinh
*Assistant Examiner* — Izunna Okeke

(57) ABSTRACT

A system and method determines the proximity of the target node to the source node from the time required to communicate messages within the node-verification protocol. The node-verification protocol includes a query-response sequence, wherein the source node communicates a query to the target node, and the target node communicates a corresponding response to the source node. The target node is configured to communicate two responses to the query: a first response that is transmitted immediately upon receipt of the query, and a second response based on the contents of the query. The communication time is determined based on the time duration between the transmission of the query and receipt of the first response at the source node and the second response is compared for correspondence to the query, to verify the authenticity of the target node.

28 Claims, 1 Drawing Sheet

US 7,991,998 B2

SECURE PROXIMITY VERIFICATION OF A NODE ON A NETWORK

CROSS REFERENCE TO RELATED APPLICATION

This application claims the benefit of U.S. provisional application Ser. No. 60/414,942 filed Sep. 30, 2002 and application Ser. No. 60/445,265 filed Feb. 5, 2003, which are incorporated herein by reference.

This invention relates to the field of communications security, and in particular, to a system and method that verifies the proximity of a node on a network.

This invention relates to the field of communications security, and in particular, to a system and method that verifies the proximity of a node on a network.

Network security can often be enhanced by distinguishing between 'local' nodes and 'remote' nodes on the network. In like manner, different rights or restrictions may be imposed on the distribution of material to nodes, based on whether the node is local or remote. Local nodes, for example, are typically located within a particular physical environment, and it can be assumed that users within this physical environment are authorized to access the network and/or authorized to receive files from other local nodes. Remote nodes, on the other hand, are susceptible to unauthorized physical access. Additionally, unauthorized intruders on a network typically access the network remotely, via telephone or other communication channels. Because of the susceptibility of the network to unauthorized access via remote nodes, network security and/or copy protection can be enhanced by imposing stringent security measures and/or access restrictions on remote nodes, while not encumbering local nodes with these same restrictions.

It is an object of this invention to provide a system and method that facilitates a determination of whether a node on a network is local or remote. It is a further object of this invention to integrate this determination with a system or method that verifies the authenticity of the node on the network.

These objects and others are achieved by a system and method that facilitates a determination of communication time between a source node and a target node within a node-verification protocol, such as the Open Copy Protection System (OCPS). The proximity of the target node to the source node is determined from the communication delay associated with a challenge-response protocol. The node-verification protocol includes a query-response sequence, wherein the source node communicates a query to the target node, and the target node communicates a corresponding response to the source node. To distinguish between the actual communication time and the time required to generate the response corresponding to the query, the target node is configured to communicate two responses to the query: a first response that is transmitted immediately upon receipt of the query, and a second response based on the contents of the query. The communication time is determined based on the time duration between the transmission of the query and receipt of the first response at the source node. The second response is compared for correspondence to the query, to verify the authenticity of the target node, and the communication time is compared to a threshold value to determine whether the target node is local or remote relative to the source node.

Throughout the drawings, the same reference numeral refers to the same element, or an element that performs substantially the same function.

Figure 1:
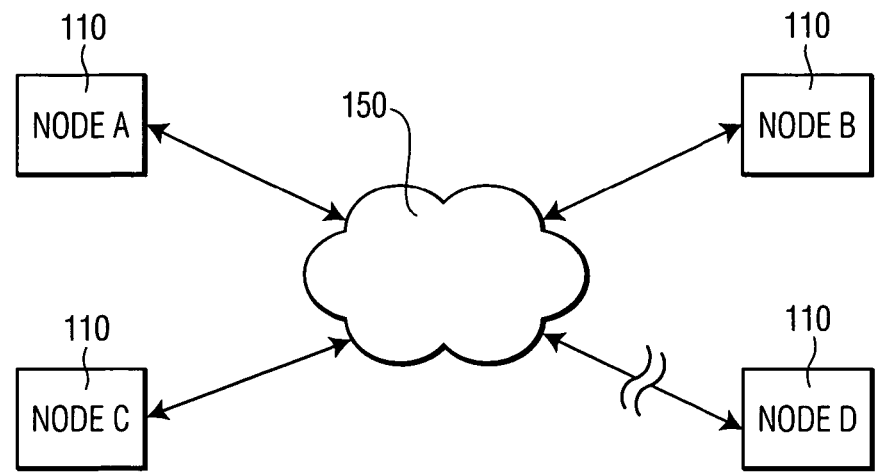
FIG. 1 illustrates an example block diagram of a network of nodes.

FIG. 1 illustrates an example block diagram of a network 150 of nodes 110. One of the nodes, NodeD 110, is illustrated as being distant from the other nodes 110. In accordance with this invention, each of the nodes 110 is configured to be able to determine the proximity of each other node 110. In a typical embodiment of this invention, the proximity determination is limited to a determination of whether the other node is "local" or "remote", although a more detailed determination of distances can be effected using the techniques disclosed herein.

Figure 2:
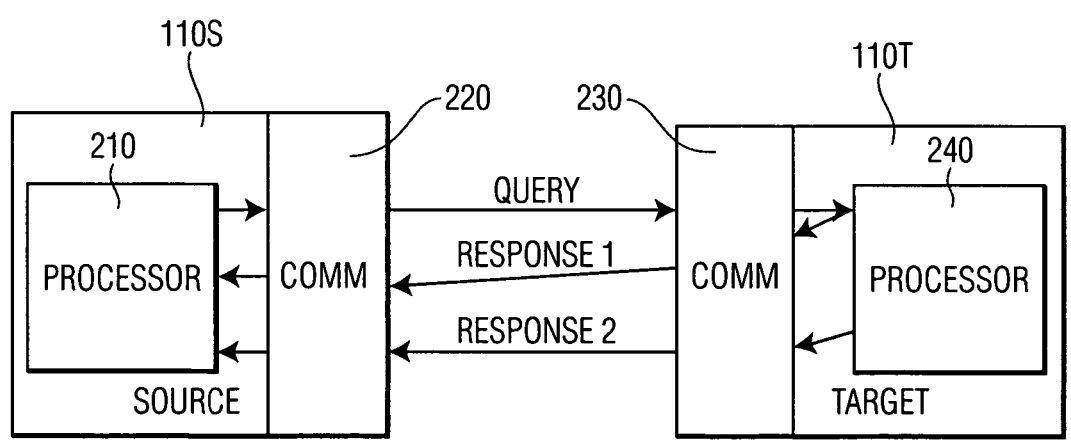
FIG. 2 illustrates an example block diagram of a source and target node that effect a query-response protocol in accordance with this invention.

FIG. 2 illustrates an example block diagram of a source node 110S and target node 110T that effect a query-response protocol to determine the proximity of the target node 110T to the source node 110S in accordance with this invention. The source node 110S includes a processor 210 that initiates a query, and a communications device 220 that transmits the query to the target node 110T. The target node 110T receives the query and returns a corresponding response, via its communications device 230. To assure that the first response corresponds to the communicated query, the protocol calls for the target node 110T to process at least a portion of the query and to include a result of this processing in the second response, via a processor 240.

The source node 110S is configured to measure the time consumed by the query-response process, and from this measure, to determine the proximity of the target node 110T. In a conventional query-response protocol, the query-response time includes the time to communicate the query and response, as well as the time to process the query and generate the response at the target node 110T, and thus the query-response time in a conventional query-response protocol is generally unsuitable for determining the communication time.

In accordance with this invention, the target node 110T is configured to provide two responses to the query. The target node 110T provides an immediate response upon receipt of the query, and then a subsequent response after processing the query. The source node 110S is configured to measure the time duration between the transmission of the query and the receipt of the first response from the target node 110T to determine the relative proximity of the target node 110T to the source node 110S. The source node is also configured to verify the authenticity of the target node 110T based on the second response from the target node 110T. In a preferred embodiment, the authenticity of the first response is also verifiable as originating from the target node 110T, either via the contents of the first response or the second response.

Using known techniques, the distance between the source 110S and target 110T can be calculated using the determined communication time between the transmission of the query from the source 110S and the receipt of the first response from the target 110T. As noted above, in a typical embodiment, the communication time is used to determine whether the target 110T is local or remote from the source 110S. This determination is made in a preferred embodiment of this invention by comparing the communication time to a nominal threshold value, typically not more than a few milliseconds. If the communication time is below the threshold, the target 110T is determined to be local; otherwise, it is determined to be remote. Multiple thresholds may also be applied, to provide for a relative measure of the degree of remoteness of the target 110T from the source 110S.

In a typical embodiment, the source 110S uses the remote/local proximity determination to control subsequent communications with the target 110T, and/or to control access of the target node to system resources, such as data and processes, based on the proximity. For example, some files may be permitted to be transferred only to local nodes, all communications with a remote node may be required to be encrypted, some files may be prohibited from inter-continental transmissions, and so on.

In a preferred embodiment of this invention, the above query-response process is integrated within a node-authentication process, such as a key-exchange process, which typically includes one or more query-response sequences.

The OCPS protocol, for example, includes an authentication stage, a key exchange stage, a key generation phase, and subsequent data transmission phases. The key exchange phase is effected via a modified Needham-Schroeder key exchange protocol, as described in "Handbook of Applied Cryptography", Menezes et al.

At the authentication stage, each of the source 110S and target 110T nodes authenticates a public key of each other using the corresponding digital certificates.

At the start of the key exchange phase, the source 110S generates a message composed of a random number and a random key. The source 110S then encrypts the message, using the public key of the target 110T, and transmits the encrypted message to the target 110T as the aforementioned query. In accordance with this invention, the source node 110S initiates a timer when these encryptions are transmitted to the target 110T.

In the conventional OCPS protocol, the target 110T decrypts the random number and random key from the source 110S, using the private key of the target 110T. The target 110T generates a message composed of a new random number, a new random key, and the decrypted random number from the source 110S, and encrypts the message, using the public key of the source 110S, to form a response that is to be communicated to the source 110S. The target 110T also signs the response, using the target's private key.

In accordance with this invention, upon receipt of the query, the target 110T communicates a first response to the source 110S, before the aforementioned decryption of the random number and random key. In one preferred embodiment of this invention, the target 110T communicates a new random number to the source 110S as the first response, and subsequently authenticates this new random number via an addendum to the conventional OCPS response that is transmitted as the second response. In another preferred embodiment, the target 110T includes a portion of the conventional OCPS response in the first response containing an encrypted and signed new random number, followed by the remainder of the conventional OCPS response.

In the first preferred embodiment, the second response includes the random number of the first response within the material that is encrypted using the public key of the source 110S, and signed using the private key of the target 110T.

In the second preferred embodiment, the first response includes the new random number, encrypted using the public key of the source 110S, and signed using the private key of the target 110T. The encryption and signature of the new random number is effected immediately after the authentication phase, so that this encrypted and signed response is available for transmission from the target 110T to the source 110S immediately upon receipt of the query from the source 110S. After sending the first response, the target 110T decrypts the query from the source 110S, using the private key of the target 110T, and generates a new message composed of a new random key and the decrypted random key. The target then encrypts the new message using the public key of the source 110S, signs the message using its private key, and transmits the enrypted and signed response contained in the query back to the source 110S, thereby verifying the identity of the target 110T to the source 110S.

When the source node 110S receives the first response, it terminates the aforementioned timer, thereby establishing a measure of the round-trip communication time between source 110S and target 110T. Upon receipt of the second response, the source node 110S verifies the signed message, using the public key of the target 110T, and decrypts the random numbers and random key from the response, using the private key of the source 110S.

To confirm the key exchange, the source 110S transmits the decrypted new random number back to the target 110T. Both the source 110S and target 110T control subsequent communications based upon receipt of the proper decrypted random numbers. In accordance with this invention, the source 110S also controls subsequent communications based upon the determined communication time.

If both nodes are verified, subsequent communications between the source 110S and target 110T encrypt the communications using a session key that is a combination of the random keys, the public keys, and a session index.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

The invention claimed is:

1. A method of determining proximity of a target node to a source node, comprising:
    preparing a first response at the target node prior to receiving any part of a query from the source node;
    communicating the query from the source node to the target node;
    communicating the first response from the target node to the source node, immediately after the query is received and before the query is processed at the target node;
    receiving the first response at the source node;
    processing the query at the target node to produce therefrom a second response that facilitates a verification of the target node and its first response;
    communicating the second response from the target node to the source node;
    determining a measure of communication time between communicating the query and receiving the first response; and
    determining the proximity of the target node based on the measure of communication time, wherein determining proximity includes comparing the measure of communication time with a threshold value, and if the communication time is below the threshold, the target node is determined to be local, otherwise the target node is determined to be remote, further comparing the measure of communication time with multiple applied thresholds for providing a relative measure of a degree of remoteness of the target node from the source node, and wherein the source node uses the remote/local proximity determination to control subsequent communications with the target node and to control access of the target node to system resources based on the determined proximity.

2. The method of claim 1, wherein the query and at least one of the first and second responses correspond to at least a portion of a cryptographic key-exchange protocol.

3. The method of claim 2, wherein the key-exchange protocol corresponds to a Needham-Schroeder key-exchange protocol.

4. The method of claim 1, wherein the query and at least one of the first and second responses correspond to at least a portion of an OCPS protocol.

5. The method of claim 1, wherein the query includes an encryption of an item based on a public key of the target node, and the processing of the query includes decrypting the item based on a private key of the target node, for inclusion in the second response.

6. The method of claim 5, wherein the first response includes a random number, and the processing of the query further includes encrypting the item and the random number using a public key of the source node to form at least a portion of the second response.

7. The method of claim 5, wherein the first response includes an encryption of a random number based on a public key of the source node.

8. The method of claim 1, wherein determining the proximity includes comparing the communication time to a threshold value that distinguishes between local and remote nodes.

9. The method of claim 1, further including restricting communications with the target node based on the proximity.

10. The method of claim 1, further including restricting access of the target node to system resources based on the proximity.

11. A node on a network including:
a processor that is configured to prepare a first response at the node prior to receiving any part of a query from a source node,
a communication device that is configured to:
receive the query from the source node,
transmit the first response to facilitate proximity verification of the node, to the source node immediately upon receipt of the query and before the query is processed, and
transmit a second response that facilitates a verification of the node to the source node, and
the processor configured to process the query and produce therefrom the second response, wherein the source node determines a measure of communication time between communicating the query and receiving the first response, determines a proximity of the node based on the measure of communication time, wherein determining proximity includes comparing the measure of communication time with a threshold value, and if the communication time is below the threshold, the node is determined to be local, otherwise the node is determined to be remote, further comparing the measure of communication time with multiple applied thresholds for providing a relative measure of a degree of remoteness of the node from the source node, and wherein the source node uses the remote/local proximity determination to control subsequent communications with the node and to control access of the node to system resources based on the determined proximity.

12. The node of claim 11, wherein the processor is configured to process the query and produce the response as part of a cryptographic key-exchange protocol.

13. The node of claim 12, wherein the key-exchange protocol corresponds to a Needham-Schroeder key-exchange protocol.

14. The node of claim 11, wherein the query and at least one of the first and second responses correspond to at least a portion of an OCPS protocol initiated by the source node.

15. The node of claim 11, wherein the query includes an encryption of an item based on a public key of the node, and the processor is configured to decrypt the item based on a private key of the node, for inclusion in the second response.

16. The node of claim 15, wherein the first response includes a random number, and the processor is configured to encrypt the item and the random number using a public key of the source node to form at least a portion of the second response.

17. The node of claim 15, wherein the first response includes an encryption of a random number based on a public key of the source node.

18. A node on a network including:
a communication device that is configured to:
transmit a query to a target node,
receive an immediate first response that has been prepared before receipt of any part of the query by the target node and transmitted by the target node before the query is processed at the target node, and
receive a second response from the target node; and
a processor that is configured to:
measure a communication time between transmitting the query and receiving the first response,
determine a proximity of the target node relative to the node based on the communication time, and
verify the target node based on the second response, wherein determining proximity includes comparing the measure of communication time with a threshold value, and if the communication time is below the threshold, the target node is determined to be local, otherwise the target node is determined to be remote, further comparing the measure of communication time with multiple applied thresholds for providing a relative measure of a degree of remoteness of the target node from the source node, and wherein the source node uses the remote/local proximity determination to control subsequent communications with the target node and to control access of the target node to system resources based on the determined proximity.

19. The node of claim 18, wherein the processor is configured to generate the query and process at least one of the first and second responses as part of a cryptographic key-exchange protocol.

20. The node of claim 19, wherein the key-exchange protocol corresponds to a Needham-Schroeder key-exchange protocol.

21. The node of claim 18, wherein the query and at least one of the first and second responses correspond to at least a portion of an OCPS protocol initiated by the node.

22. The node of claim 18, wherein the query includes an encryption of an item based on a public key of the target node, and the second response includes a decryption of the item based on a private key of the target node.

23. The node of claim 22, wherein the first response includes a random number, and the second response includes an encryption of the decryption of the item and the random number, using a public key of the node.

24. The node of claim 23, wherein the second response further includes a signature of the decryption of the item and the random number, using a private key of the target node.

25. The node of claim 22, wherein the first response includes an encryption of a random number based on a public key of the node.

26. The node of claim 18, wherein the processor is configured to determine the proximity based on a comparison of the communication time to a threshold value that distinguishes between local and remote nodes.

27. The node of claim 18, wherein the processor is further configured to control subsequent communications with the target node based on the proximity.

28. The node of claim 18, wherein the processor is further configured to control access of the target node to system resources based on the proximity.

* * * * *